(12) United States Patent
Zacks et al.

(10) Patent No.: US 11,188,481 B2
(45) Date of Patent: Nov. 30, 2021

(54) SYSTEMS AND METHODS FOR EXECUTING SENSOR APPLICATIONS ON NETWORK PLATFORMS

(71) Applicant: Cisco Technology, Inc., San Jose, CA (US)

(72) Inventors: David John Zacks, Vancouver (CA); Anoop Vetteth, Fremont, CA (US); Tarunesh Ahuja, Fremont, CA (US); Davi Gupta, Dublin, CA (US); Jagbir Kang, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 153 days.

(21) Appl. No.: 16/556,454

(22) Filed: Aug. 30, 2019

(65) Prior Publication Data

US 2021/0064553 A1  Mar. 4, 2021

(51) Int. Cl.
*G06F 13/10* (2006.01)
*G06F 11/22* (2006.01)

(52) U.S. Cl.
CPC ........ *G06F 13/105* (2013.01); *G06F 11/2273* (2013.01)

(58) Field of Classification Search
None
See application file for complete search history.

(56) References Cited

U.S. PATENT DOCUMENTS

| | | | |
|---|---|---|---|
| 2005/0172141 A1* | 8/2005 | Gayde | H04L 63/0869 713/191 |
| 2013/0096831 A1* | 4/2013 | Chan | H04W 4/38 702/1 |
| 2016/0379165 A1* | 12/2016 | Moakley | H04W 4/029 705/333 |
| 2020/0289026 A1* | 9/2020 | Bardy | A61B 5/1112 |

* cited by examiner

*Primary Examiner* — Craig C Dorais
(74) *Attorney, Agent, or Firm* — Meunier Carlin & Curfman LLC

(57) ABSTRACT

In an implementation, a method is provided. The method may include: receiving a sensor application by a network platform, the network platform comprising a processing module and a plurality of ports, and wherein a first portion of the processing module is allocated to an operating system of the network platform; allocating a second portion of the processing module to the sensor application by the network platform; executing the sensor application by the second portion of the processing module; emulating a port of the plurality of ports by the second portion of the processing module; and allowing the executed sensor application to interact with the operating system through the emulated port.

19 Claims, 5 Drawing Sheets

SYSTEMS AND METHODS FOR EXECUTING SENSOR APPLICATIONS ON NETWORK PLATFORMS

BACKGROUND

The present disclosure relates generally to network platforms such as switches and routers.

BACKGROUND

Currently, to test a network platform, such as a switch or router, a technician will attach a sensor device to a physical port of the network platform. The sensor device may then run various tests that relate to the functioning of the network platform and any networking services or functions provided by the network platform. The sensor device may then generate data, such as a report, that can be used to determine if the network platform, and associated networking services and functions, are performing correctly. However, many network platforms may be installed in locations that are not easily reached by technicians making it difficult to physically install sensor devices.

BRIEF DESCRIPTION OF THE DRAWINGS

The following detailed description of illustrative embodiments is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DESCRIPTION OF EXAMPLE EMBODIMENTS

Overview

Figure 1:
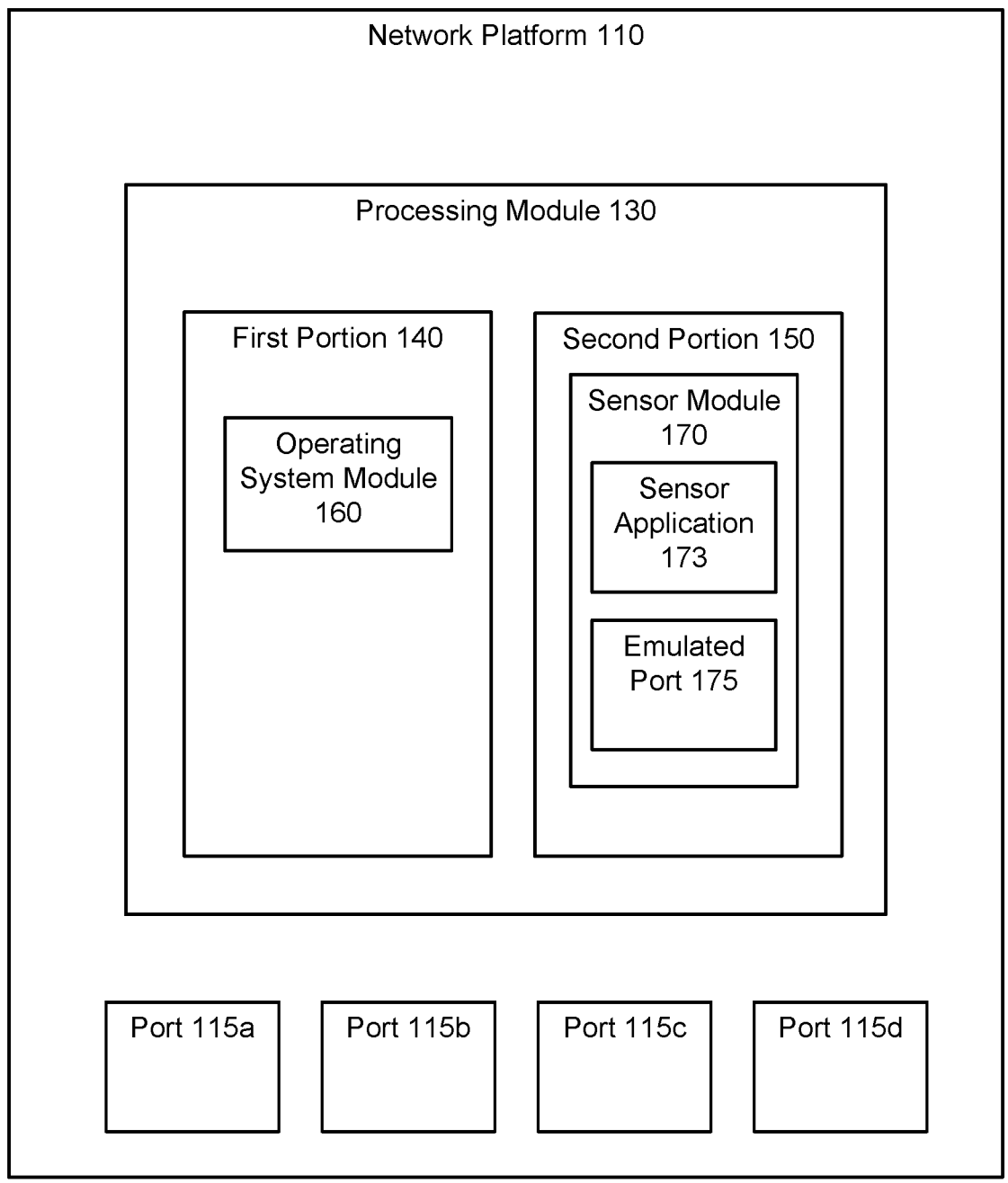
FIG. 1 is an illustration of an exemplary network platform capable of executing one or more sensor applications.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In an implementation, a device is provided that may include a plurality of ports, a processing module and a memory communicably coupled to the processing module. The memory may store an operating system module and a sensor module. The operating system module may include instructions that when executed by the processing module cause the processing module to perform one or more networking operations with respect to the plurality of ports, wherein the operating system module is allocated a first portion of the processing module. The sensor module may include instructions that when executed by the one or more processors cause the processing module to: execute a sensor application; emulate a port of the plurality of ports; and allow the executed sensor application to interact with the operating system module through the emulated port, wherein the sensor module is allocated a second portion of the processing module.

In an implementation, a method is provided. The method may include: receiving a sensor application by a network platform, the network platform comprising a processing module and a plurality of ports, and wherein a first portion of the processing module is allocated to an operating system of the network platform; allocating a second portion of the processing module to the sensor application by the network platform; executing the sensor application by the second portion of the processing module; emulating a port of the plurality of ports by the second portion of the processing module; and allowing the executed sensor application to interact with the operating system through the emulated port.

In an implementation, a method is provided. The method may include: providing information about a plurality of sensor applications by a computing device, wherein each sensor application emulates the operation of a sensor device connected to a port of a network platform; receiving a selection of a sensor application of the plurality of sensor applications by the computing device; in response to the selection of the sensor application, causing the selected sensor application to be installed on the network platform by the computing device, wherein the network platform comprises a first processing module and a second processing module; receiving data associated with the execution of the sensor application on the network platform by the computing device, wherein the sensor application was executed by the second processing module and an operating system of the network platform was executed by the first processing module; and generating a report based on the received data by the computing device.

Example Embodiments

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

FIG. 1 is an illustration of an exemplary network platform 110 capable of executing one or more sensor applications 173. As shown, the network platform 110 includes a processing module 130 and one or more ports 115 (i.e., the ports 115*a*-*d*). The ports 115 may be any type of port that is commonly used to interface with a sensor device such as ethernet. Other types of ports may be supported. While only four ports 115 are show, it is for illustrative purposes only. More or fewer ports 115 may be supported.

The processing module 130 may include processing and memory resources that may be used by the network platform 110 to provide or perform network services and operations to attached devices. The processing module 130 may include one or more processors and some amount of memory. The memory may be part of the one or more processors or separate from the one or more processors. Any type of processors and/or memory combinations may be used.

The network platform 110 as used herein includes any type of computing device that can provide or perform network services and operations to attached devices. Examples of network platforms include switches and routers. Depending on the embodiment, the network platform 110 may be implemented by one or more of the computing devices 500 illustrated with respect to FIG. 5.

The network platform 110 may include an operating system module 160. The operating system module 160 may be configured to execute one or more operating systems for the network platform 110. The executed operating systems may generally control the operation of the network platform 110 and ports 115, and may further provide the various network services and operations to one or more connected sensor devices.

As described above, one drawback associated with testing network platforms 110 using sensor devices is that the sensor devices must be physically connected to one or more ports 115 in order to perform the various tests. Accordingly, to solve the drawbacks associated with sensor devices, the network platform 110 includes a sensor module 170 that is configured to execute one or more sensor applications 173 and to emulate at least one port 115 (i.e., the emulated port 175) of the network platform 110.

Each sensor application 173 may emulate or provide similar functionality to a sensor device that is physically connected to the network platform 110 through a port 115. However, because the sensor application 173 is software that is executed by the network platform 110 and "connected" to the operating system module 160 through the emulated port 175, the network platform 110 can be tested without a technician having to visit the network platform 110 and physically connect the sensor application 173. Instead, as will be described further with respect to FIG. 2, the sensor application 173 may be downloaded to the sensor module 170 of the network platform 130 from a sensor application server.

Examples of sensor applications 173 that could be executed by the sensor module 170 include onboarding applications (e.g., test 802.1X services, ISE and Radius services, authentication methods such as TLS and PEAP, and DHCP), network and server reachability testing applications (e.g., what computers are or are not reachable by devices connected to the network platform 110), service functionality testing applications (e.g., test email applications, FTP applications, and HTTP applications), and quality testing applications (e.g., test network quality metrics such as latency, jitter, packet loss, and speed testing). Further examples of sensor applications 173 will be discussed below.

As will be discussed further with respect to FIG. 2, while or after the sensor application 173 is executed, the sensor module 170 may generate and/or collect data about the execution of the sensor application 173. The data may include results or other indicators about the success or failure of the various tests being performed by the sensor application 173 with respect to the network platform 110 and the operating system via the emulated port. The data may later included in a report that is electronically provided to the user or administrator that selected the sensor application 173.

As may be appreciated, a network platform 110 may be used for a variety of mission critical operations, and therefore an administrator of the network platform 110 may be reluctant to execute sensor applications 173 using the same processing module 130 used by the operating system module 160. For example, the administrator may be concerned that the sensor applications 173 might starve the operating system module 160 of processor or memory resources.

Accordingly, to separate the execution of the operating system module 160 and the sensor module 170, the resources of the processing module 130 may be divided into a first portion 140 and a second portion 150. The first portion 140 may be allocated some percentage of the processing capability and memory resources of the processing module 130, and the second portion 140 may be allocated the remaining processing capability and memory resources.

The allocated processing capability and memory resources may be enforced such that the operating system module 160 has access to the same amount of memory and processing regardless of the memory and processing needs of the sensor module 170 and any sensor applications 173. Thus, if the operating system module 160 is fairly inactive and not using the allotted resources of the first portion 140, while the sensor module 170 is struggling to meet the resource needs of the sensor applications 173 using the second portion 150 of the processing module 130, none of the resources of the first portion will be reallocated to the second portion 150. Accordingly, a minimum amount of processor and memory resources are guaranteed to the operating system module 160 regardless of the demands of the sensor module 170. Moreover, the memory of the processing module 130 may be allocated between the first portion and the second portion 150 so that the sensor module 170 cannot access or read memory being used by the operating system module 160 and vice versa.

The processing resources of processing module 130 may be allocated between the first portion 140 and the second portion 150 in a variety of ways. In one embodiment, the processing module 130 may include two processors, and the first portion 140 may be allocated one processor and the second portion 150 may be allocated the other processor. In another embodiment, the processing module 130 may include a multicore processor, and the first portion 140 may be allocated one set of cores and the second portion 150 may be allocated the remaining cores. The memory resources of the processing module 130 may similarly be allocated between the first portion and the second portion. Any method for allocating processor and memory resources may be used.

The sensor module 170 may execute a sensor application 173 using the resources of the second portion 150. The sensor application 173 may interact with the operating system module 160 through the emulated port 175. To the operating system 160, the sensor application 173 may be indistinguishable from a physical sensor device connected to one or more of the physical ports 115. Thus, any test or other networking operations that may be performed by the operating system module 160 with respect to a physical device connected to a port 115, may be performed by the operating system module 160 with respect to a sensor application 173 connected to the emulated port 175. For example, the sensor application 173 may have a MAC address and may receive an IP address from the operating system module 160 that is based on its MAC address, just like a corresponding sensor device.

Figure 2:
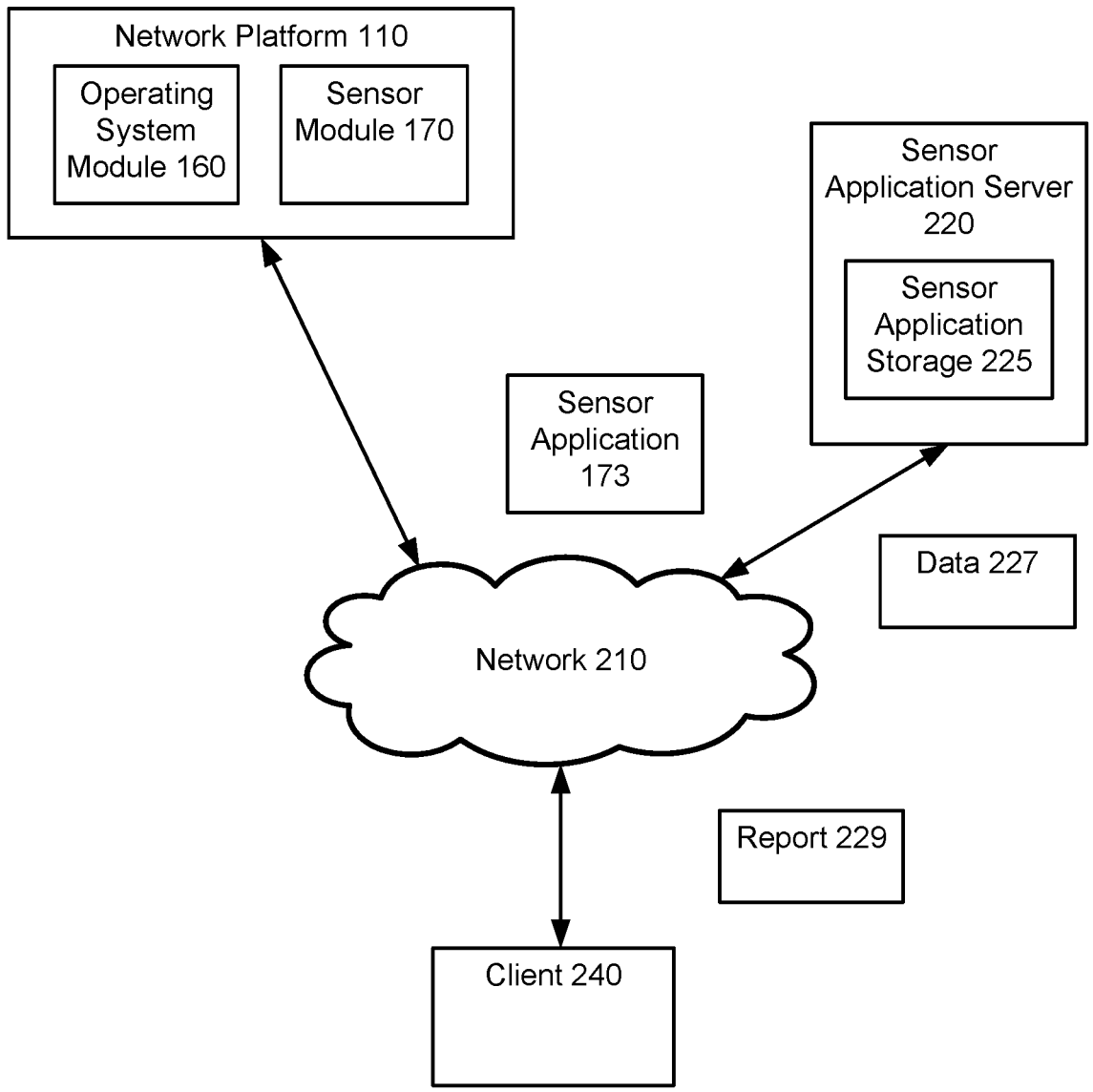
FIG. 2 is a block diagram illustrating an exemplary environment for selecting, installing, and executing sensor applications on a network platform.

FIG. 2 is a block diagram illustrating an exemplary environment for selecting, installing, and executing sensor applications on a network platform. As shown, the environment 200 includes a network platform 110, a sensor application server 220, and a client 240 communicating through a network 210. The network 210 may be a combination of a public and private networks and may include the internet. Each of the network platform 110, the sensor application server 220, and the client 240 may be implemented by one or more of the computing devices 500 illustrated with respect to FIG. 5.

The sensor application server 220 may make one or more sensor applications 173 available for download to the sensor modules 170 of corresponding network platforms 110. For example, the sensor application server 220 may host an online marketplace where users or administrators may browse sensor applications 173 that are available for download. The users or administrators may connect to the sensor application server 220 using associated clients 240. The available sensor applications 173 may be stored by the sensor application server 220 in sensor application storage 225.

As may be appreciated, the client 240 and the network platform 110 associated with a particular user or administrator may be at different locations. Therefore, when there is an issue with the network platform 110 and the user or administrator would like to perform one or more tests on the network platform, it may be difficult for the user or administrator to physically travel to the location of the network platform 110 to install physical sensor devices into the physical ports 115 of the network platform 110 in order to perform the one or more tests.

Accordingly, when a user or administrator desires to perform a test associated with a physical sensor device, the user or administrator may use their client 240 to connect to the sensor application server 220. The sensor application server 220 may then present the user or administrator (using a webpage, for example) with a list of the sensor applications 173 that are available in the sensor application storage 225. The user or administrator may then select a sensor application 173 that emulates, or performs the same tests, as the desired physical sensor device, and the sensor application server 220 may then push or otherwise install the selected sensor application 173 on the sensor module 170 of the network platform 110 associated with the user or administrator.

As described previously, the sensor application 173 is executed by the sensor module 170 and may interact with the operating system module 160 of the network platform 110 using an emulated port 175. According, the sensor application 173 connected to the emulated port 175 performs substantially similar to a corresponding physical sensor device connected to a physical port 115 of the network platform 110.

As the sensor module 170 executes the sensor application 173, the sensor module 170 may collect data 227 associated with the execution. The data 227 may include data such as the result or statistics generated by the operating system module 160 and/or the sensor application 173 due to the tests or other networking operations or functions performed by the sensor application 173. Depending on the embodiment, the sensor module 170 may transmit the collected data 227 to the sensor application server 220 as the data 227 is generated or may wait to transmit the data 227 until the sensor module 170 has completed the execution of the sensor application 173.

The sensor application server 220 may generate one or more reports 229 based on the data 227 received from the sensor module 170. The reports 229 may include the results of the tests, functions, and networking operations performed by the sensor application 173 while executed by the sensor module 170 of the network platform 110. The report 229 may be pushed or transmitted to the client 240, and/or the client 240 may connect with the sensor application server 220 to view the report. The user or administrator may then select to perform additional tests or functions using the sensor application 173 or may select one or more additional sensor applications 173 to run on the sensor module 170 of the network platform 110.

As described above, the sensor applications 173 may be used for a variety of purposes with respect to network platforms 110 such as switches or routers. One example use of a sensor application 173 is to test the initial client setup procedure and services connectivity provided to new clients by the network platform 110. The sensor application 173 may run various tests that simulate the various network services that are made available to new clients. For example, the sensor application 173 may ping various servers to make sure that they are reachable by the sensor module 170 through the network platform 110. Other tests may be performed. The tests may be performed at different QoS levels and from different client VLANs and subnets, for example.

Another example use of a sensor application 173 is to perform an onboarding check. The sensor application 173 may run various tests that relate to onboarding. For example, the sensor application 173 may perform steps related to 802.1x authentication. Other tests may be performed.

Another example use of a sensor application 173 is to perform AP emulation. The sensor application 173 may run various tests that simulate the operation of an AP including connecting to WLC, onboarding, CAPWAP, and VXLAN. Other tests may be performed. The sensor application 173 may be used to identify any issues with AP onboarding or client services and connectivity.

Another example use of a sensor application 173 is to test policy assurance on the network platform 110. The sensor application 173 may run various tests that determine what services a client is able to access (and not access) via the network platform 110. The determined services may then be compared with network policies to determine any policy violations which may be sent to a user or administrator.

Another example use of a sensor application 173 is to perform performance tests with respect to the network platform 110. The sensor application 173 may run various tests that determine the speeds between the sensor application 173 and various network resources through the network platform 110. The determined speeds for each network resource may be sent to a user or administrator.

Another example use of a sensor application 173 is to perform general troubleshooting with respect to the network platform 110. The sensor application 173 may run various tests selected by a user or administrator related to troubleshooting particular network issues. The results of the troubleshooting may be sent to a user or administrator.

Another example use of a sensor application 173 is to perform pre-deployment testing for a network platform 110. Before a network platform 110 is used by actual clients, one or more sensor applications 173 may be ran that each simulate the operation of a particular client device that may be connected to the network platform 110 when it is deployed. The results of the simulated clients can be used to determine if the network platform 110 may be deployed, or if more testing or adjustments are necessary.

Another example use of a sensor application 173 is to perform testing of new client policies for a network platform 110. Before a new policy or set of policies is pushed to all client devices associated with a network platform 110, sensor applications 173 that emulate the client devices may first test the new policies on the network platform 110. Compliance and/or violations of the policies by the sensor applications 173 may be collected and provided to the user or administrator associated with the network platform 110. If the policies are verified as working correctly, they may be pushed to the client devices associated with the network platform 110.

Another example use of a sensor application 173 is as a honeypot to attract attacker or malicious users. A sensor application 173 is installed on the network platform 110 that purports to run a service or to provide a resource that is attractive to attackers. Attacks and probe attempts are noted and logged by the sensor application 173. The information may then be provided to a user or administrator of the network platform 110, who may then use the information to identify possible attackers or malicious users of the network platform 110.

Figure 3:
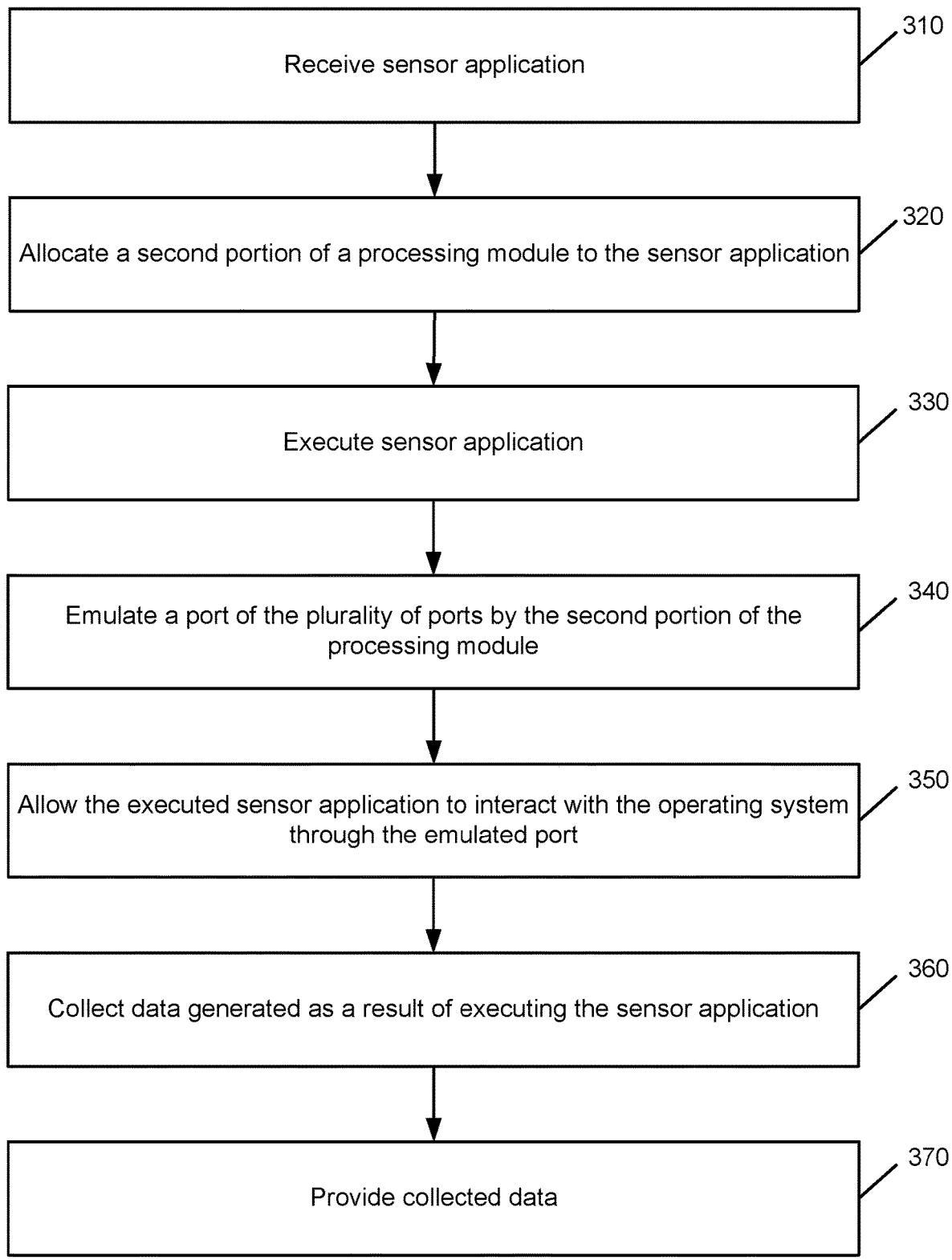
FIG. 3 is an operational flow of an implementation of a method of executing a sensor application on a network platform.

FIG. 3 is an operational flow of an implementation of a method 300 of executing a sensor application 173. The method 300 may be implemented by a network platform 110, for example.

At 310, a sensor application is received. The sensor application 173 may be received by the network platform 110. The network platform 110 may be a switch or a router that includes a plurality of ports 115. The network platform 110 may include a processing module 130 (e.g., a processor and a memory). A first portion 140 of the processing module 130 may be allocated to an operating system that performs various networking operations, procedures, and functions for one or more devices connected to the network platform 110. These may include packet routing and forwarding, DNS services, IP address assignment, packet filtering, and firewall functions, for example.

The sensor application 173 may be received by the network platform 110 from a sensor application server 220. The sensor application 173 may emulate the behavior and functionality of a corresponding physical sensor connected to one of the ports 115. Examples of sensor applications 173 include an onboarding application, a policy assurance application, a performance testing application, a troubleshooting application, a client emulation application, an access point emulation application, and a deployment testing application. Other types of sensor applications 173 may be supported.

At 320, a second portion of the processing module is allocated to the sensor application. The second portion 150 may be allocated to the sensor application 173 by the network platform 110. In one embodiment, the first portion 140 may include a first processor of the processing module 130 and the second portion 150 may include a second processor of the processing module 130. In another embodiment, the first portion 140 may include a first subset of cores of a processor of the processing module 130 and the second portion 150 may include a second subset of cores of the processor of the processing module 130.

At 330, the sensor application is executed. The sensor application 173 may be executed by the second portion 150 of the processing module 130 of the network platform 110.

At 340, a port of the plurality of ports is emulated. The emulated port 175 may be emulated by the sensor module 170. Any method for port emulation may be used.

At 350, the sensor application is allowed to interact with the operating system through the emulated port. The sensor application 173 may be allowed to interact with the operating system through the emulated port 175 by the sensor module 130 of the network module 110. The sensor application 173, when communicating through the emulated port 175, may appear to the operating system of the network platform 110 as a physical device connected to one of the ports 115. For example, the sensor application 173 may receive an IP address from the operating system through the emulated port 175.

At 360, data generated as a result of executing the sensor application is collected. The data 227 may be generated by the sensor application 173 or the operating system while the sensor application 173 interacts with the operating system. For example, the sensor application 173 may perform one or more tests, and the data 227 may be the results associated with the performance of the tests.

At 370, the collected data is provided. The collected data 227 may be provided to the sensor application server 220 (i.e., the server that the sensor application 173 was received from). The sensor application server 220 may then use the collected data 227 to generate a report 229 about the execution of the sensor application 173. The report 229 may be stored or distributed to a user or administrator associated with the network platform 110.

Figure 4:
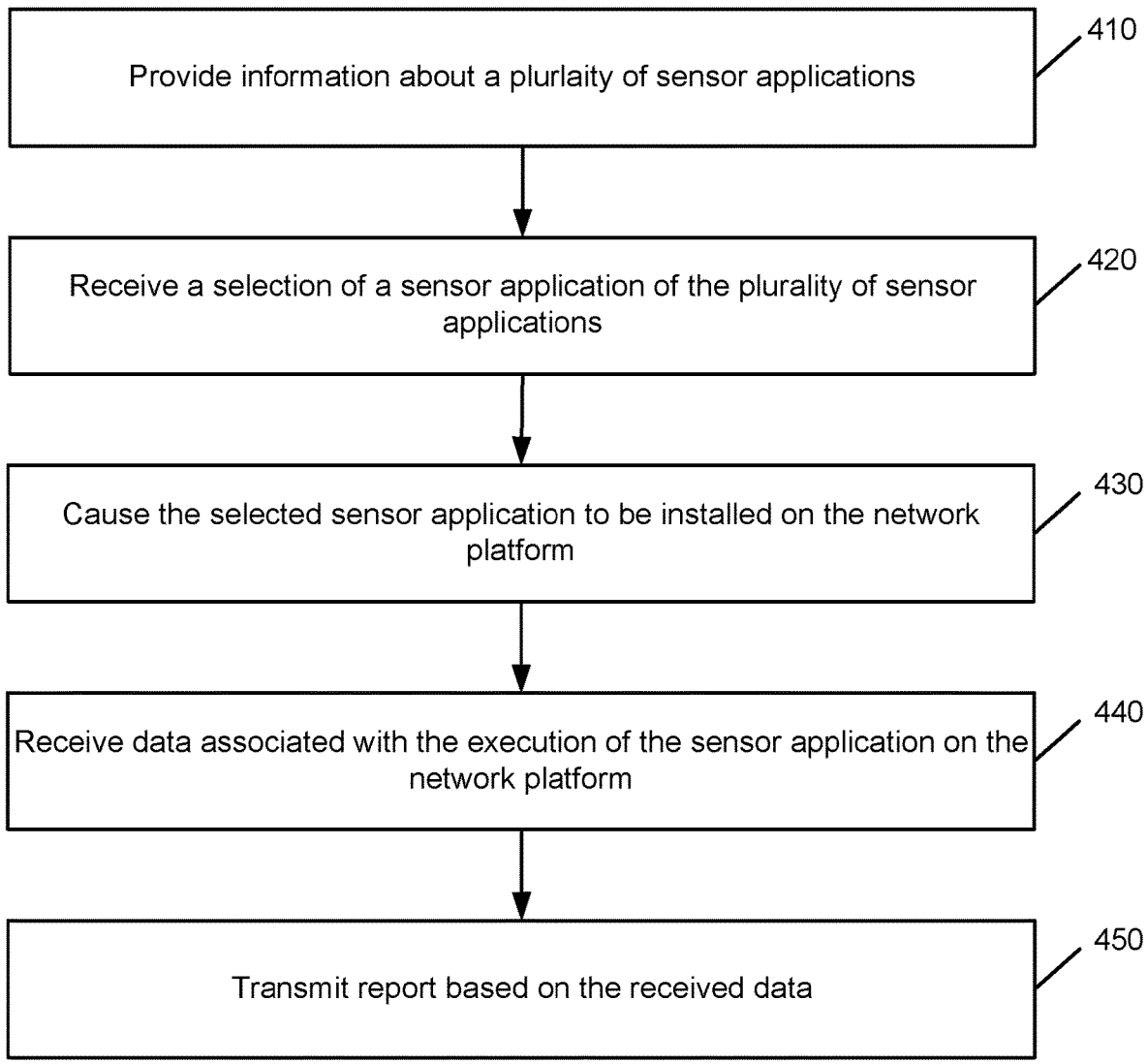
FIG. 4 is an operational flow of an implementation of a method of selecting and installing sensor applications on a network platform.

FIG. 4 is an operational flow of an implementation of a method of selecting and installing sensor applications on a network platform. The method 400 may be implemented by a sensor application server 220, for example.

At 410, information about a plurality of sensor applications is provided. The information may be provided by a sensor application server 220 to a user or administrator associated with a network platform 110 such as a router or a switch. The plurality of sensor applications 173 may be stored by the sensor application server 220 in the sensor application storage 225. Depending on the embodiment, the user or administrator associated with the network platform 110 may be used a client device 240 to view the sensor applications 173 that are available from the sensor application server 220. Each sensor application 173 may emulate a physical sensor device connected to one or more physical ports 115 of the network device 110. However, because the sensor application 173 may be downloaded to the sensor module 170 of the network platform from the sensor application server 220, the user or administrator may use the sensor application 173 to perform one or more tests of the network platform 110 without having to physically be at the location of the network platform 110.

At 420, a selection of a sensor application of the plurality of sensor applications is received. The selection may be received by the sensor application server 220 from the client 240.

At 430, the selected sensor application is caused to be installed on the network platform. The selected sensor application 173 may be installed on the sensor module 170 of the network platform 110 by the sensor application server 220. For example, the sensor application server 220 may push the selected sensor application 173 through the network 210 to the sensor module 170 of the network platform 110. Other methods or techniques for installing applications may be used.

At 440, data associated with the execution of the sensor application on the network platform is received. The data 227 may be received by the sensor application server 220 from the sensor module 170 of the network platform 110. The data 227 may include results of one or more tests ran by the selected sensor application 173 on the network platform 110.

At 450, a report based on the data is transmitted. The report 229 may be transmitted by the sensor application server 220 to the client 240 (i.e., the client 240 associated with the user or administrator that selected the sensor application 173). The report 229 may be based on the data 227.

Figure 5:
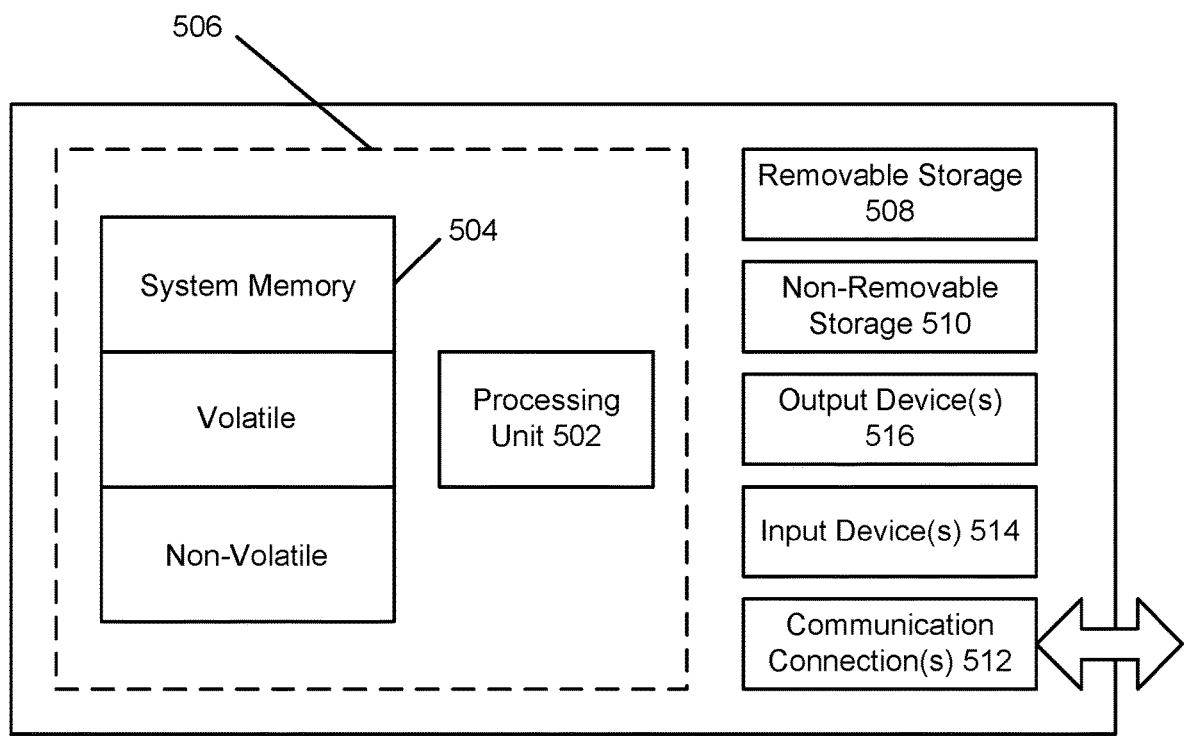
FIG. 5 shows an exemplary computing environment in which example embodiments and aspects may be implemented.

FIG. 5 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 500. In its most basic configuration, computing device 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing device 500 may have additional features/functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of computer readable media. Computer readable media can be any available media that can be accessed by the device 500 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 500.

Computing device 500 may contain communication connection(s) 512 that allow the device to communicate with other devices. Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

The present invention has been explained with reference to specific embodiments. For example, while embodiments of the present invention have been described as operating in connection with IEEE 802.3 networks, the present invention can be used in connection with any suitable wired network environment. Other embodiments will be evident to those of ordinary skill in the art.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:
1. A device comprising:
a plurality of ports;
a first processing module;
a second processing module; and a memory communicably coupled to the first and second processing modules and storing:
  an operating system module including instructions that when executed by the first processing module cause the first processing module to:
    perform one or more networking operations with respect to the plurality of ports, wherein the operating system module is allocated the first processing module; and
    receive a sensor application of a plurality of applications available at a sensor application server, wherein the sensor application is caused to be installed by the sensor application server; and
  a sensor module including instructions that when executed by the first processing module cause the first processing module to:
    execute the sensor application;
    emulate a port of the plurality of ports;-and
    allow the executed sensor application to interact with the operating system module through the emulated port, wherein the sensor module is allocated the second processing module.

2. The device of claim 1, wherein the device comprises a network platform.

3. The device of claim 2, wherein the network platform comprises a switch or a router.

4. The device of claim 1, wherein the sensor application is assigned one or more of a MAC address and an IP address.

5. The device of claim 1, wherein the sensor application emulates a physical sensor connected to the emulated port of the plurality of ports.

6. The device of claim 1, wherein the sensor application is one or more of an onboarding application, a policy assurance application, a performance testing application, a troubleshooting application, a client emulation application, an access point emulation application, and a deployment testing application.

7. The device of claim 1, wherein the processing module comprises a processor with a plurality of cores, and wherein the first portion of the processing module comprises a first subset of the cores of the plurality of cores and the second portion of the processing module comprises a second subset of cores of the plurality of cores.

8. The device of claim 1, wherein the processing module comprises a first processor and a second processor, and wherein the first portion of the processing module comprises the first processor and the second portion of the processing module comprises the second processor.

9. A method comprising:
  receiving a sensor application of a plurality of applications pushed from a sensor application server by a network platform, the network platform comprising a first processing module, a second processing module, and a plurality of ports, and wherein the first processing module is allocated to an operating system of the network platform, wherein the sensor application is caused to be installed by the sensor application server;
  allocating the second processing module to the sensor application by the network platform;
  executing the sensor application by the second processing module;
  emulating a port of the plurality of ports by the second processing module; and
  allowing the executed sensor application to interact with the operating system through the emulated port.

10. The method of claim 9, wherein the network platform comprises a switch or a router.

11. The method of claim 9, further comprising assigning one or more of a MAC address and an IP address to the sensor application.

12. The method of claim 9, wherein the sensor application emulates a physical sensor connected to the emulated port of the plurality of ports.

13. The method of claim 9, wherein the sensor application is one or more of an onboarding application, a policy assurance application, a performance testing application, a troubleshooting application, a client emulation application, an access point emulation application, and a deployment testing application.

14. The method of claim 9, wherein the first processing module comprises a first subset of cores of a plurality of cores and the second processing module comprises a second subset of cores of the plurality of cores.

15. The method of claim 9, wherein the sensor application was received through a network from the sensor application server.

16. The method of claim 15, further comprising:
  collecting data generated as a result of executing the sensor application; and
  providing the collected data to the sensor application server.

17. The method of claim 9, further comprising:
  testing one or more networking operations associated the operating system using the emulated port.

18. The method of claim 17, further comprising:
  providing results of the testing of the one or more networking operations.

19. A method comprising:
  providing information about a plurality of sensor applications by a computing device, wherein each sensor application emulates the operation of a sensor device connected to a port of a network platform;
  receiving a selection of a sensor application of the plurality of sensor applications by the computing device;
  in response to the selection of the sensor application, causing the selected sensor application to be installed on the network platform by the computing device, wherein the network platform comprises a first processing module and a second processing module;
  receiving data associated with the execution of the sensor application on the network platform by the computing device, wherein the sensor application was executed by the second processing module and an operating system of the network platform was executed by the first processing module; and
  generating a report based on the received data by the computing device.

* * * * *